(12) United States Patent
Benmohamed et al.

(10) Patent No.: US 6,771,602 B1
(45) Date of Patent: Aug. 3, 2004

(54) METHOD AND APPARATUS FOR DYNAMIC EPD THRESHOLD FOR UBR CONTROL

(75) Inventors: Lotfi Benmohamed, Freehold, NJ (US); Young-Terng Wang, Marlboro, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/451,810

(22) Filed: Nov. 29, 1999

(51) Int. Cl.$^7$ ............................. H04J 1/16; H04J 3/14
(52) U.S. Cl. ................. 370/232; 370/230.1; 370/235; 370/231
(58) Field of Search ................. 370/229–232, 370/235, 395.43, 237, 238–238.1, 389, 392, 395.42, 395.44, 400, 409, 410

(56) References Cited

U.S. PATENT DOCUMENTS

| | | | | |
|---|---|---|---|---|
| 5,864,538 A | * | 1/1999 | Chong et al. | 370/235 |
| 6,219,728 B1 | * | 4/2001 | Yin | 710/52 |
| 6,466,579 B1 | * | 10/2002 | Scott et al. | 370/395.71 |

OTHER PUBLICATIONS

Wu, Buffer Management and Scheduling for TCP/IP Over ATM–GFR, 1998, IEEE, pp. 519–524.*
Hernandez–Valencia, Enrique J. et al, "Rate Control Algorithms for the ATM ABR Service", Focus, Oct. 21, 1996.
Bonomi, Flavio and Fendick, Kerry W., "The Rate–Based Flow Control Framework for the Available Bit Rate ATM Service", IEEE Network, Mar./Apr. 1995, pp. 25–39.
Romanow, Allyn and Floyd, Sally, "Dynamics of TCP Traffic over ATM Networks", IEEE Journal on Selected Areas in Communications, May, 1995.

* cited by examiner

*Primary Examiner*—Seema S. Rao
*Assistant Examiner*—Ronald Abelson

(57) ABSTRACT

A method and apparatus for providing ABR and UBR services with one FIFO queue. The queue accepts UBR data until a threshold queue capacity (EPD) is reached, at which point data is dropped. This threshold is dynamically adjusted by adding a value proportional to the difference between the actual UBR bandwidth and the target UBR bandwidth. Applications sending data for ABR service are provided with a feedback which allows those applications to regulate the speed at which data is transmitted to the queue, this feedback is a function of some threshold value (AQT) which is also dynamically adjusted as described above. If the queue is being underutilized, an adjustment is made to both EPD and AQT.

18 Claims, 4 Drawing Sheets

METHOD AND APPARATUS FOR DYNAMIC EPD THRESHOLD FOR UBR CONTROL

BACKGROUND OF THE INVENTION

1. Field of the Invention

The present invention relates to the control of the UBR service class. The present invention also relates to service class sharing in queues. More specifically, the present invention relates to bandwidth and buffer control in FIFO queues which must serve two kinds of service classes.

2. Description of the Prior Art

In devices for sending data, two service classes, ABR (available bit rate) and UBR (unspecified bit rate) are often used in tandem to provide different types of best-effort service classes.

The UBR service class is well known in the prior art. This service class is intended to use any available unused bandwidth from other classes. The method for controlling the buffer in the use of UBR service is the intelligent frame discard mechanism EPD (early packet discard). When new data arrives at the buffer but the buffer has been filled beyond a specific level, the new data is dropped. This specific level of the buffer which triggers packet dropping is the EPD threshold.

The ABR service class is also well known in the prior art. ABR service is based on a reactive scheme—the use of ABR service allows dynamic response to the current availability of buffer and bandwidth, allowing the use of any resources that are not being consumed by higher-priority service classes and so providing for use of a valuable resource without unduly harming the performance of those higher-priority service classes.

ABR service economically supports applications where guidelines are available as to the range of viable bandwidth requirements of those applications, but not specific bandwidth is required. Applications served by ABR service are expected to recognize the amount of throughput that is being provided through ABR and to adjust to changes in the available resources. Applications served by ABR can expect only that the MCR (minimum cell rate) of connections that have been admitted to ABR service will be maintained, with a reasonably low rate of cell loss.

This would occur in an ATM (asynchronous transfer mode) switch containing at least one input port and at least one output port, each port having an associated transmission link, which is well known in the prior art.

In order to provide service to both the ABR (available bit rate) and UBR (unspecified bit rate) service classes, the prior art teaches using separate queues, with separate buffer and bandwidth allotments.

ABR and UBR service classes have no strict QoS (Quality of Service) requirements in terms of delay and/or cell loss rate.

In order to provide ABR and UBR service, the prior art discloses the use of two queues, each with separate buffer and bandwidth allotments. Each queue must be separately supported by the scheduler, and the queues are costly resources, especially for use on best-effort service classes.

SUMMARY OF THE INVENTION

A method and apparatus for providing ABR and UBR services with one FIFO queue. The queue accepts UBR data until a threshold queue capacity (EPD) is reached, at which point data is dropped. This threshold is dynamically adjusted by adding a value proportional to the difference between the actual UBR bandwidth and the target UBR bandwidth. Applications sending data for ABR service are provided with a feedback which allows those applications to regulate the speed at which data is transmitted to the queue, this feedback is a function of some threshold value (AQT) which is also dynamically adjusted as described above. If the queue is being underutilized, an adjustment is made to both EPD and AQT.

BRIEF DESCRIPTION OF THE DRAWINGS

FIG. 4 maps the setting of the threshold values, and FIG. 5 the resulting bandwidth allocation.

DETAILED DESCRIPTION

In order to allow for the use of one queue for use by both ABR and UBR service classes, for example, in an ATM switch with five ATM service classes (including ABR and UBR) but only four queues, and in which the other three service classes have their own separate queues, an efficient method must be provided. Serving both service classes on one queue with an efficient method for coordinating the use of the buffer and bandwidth of that queue by both services, as disclosed in the present invention, results in a significant resource savings.

Figure 1:
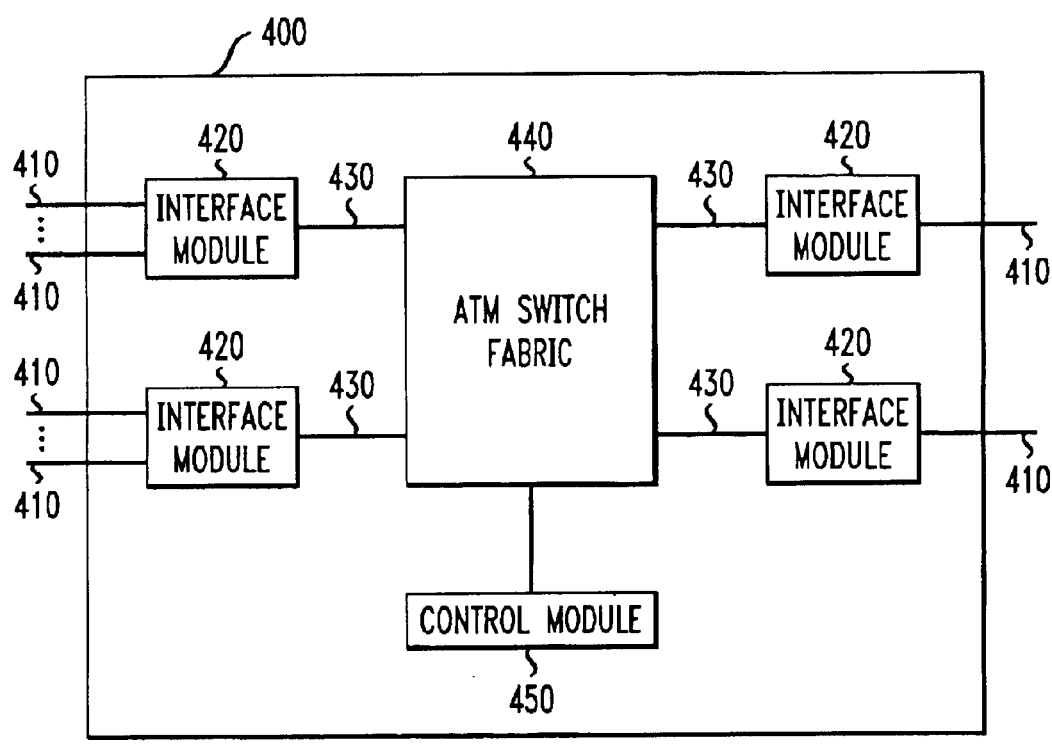
FIG. 1 illustrates an ATM switch.

FIG. 1 illustrates an ATM switch 400. The ATM switch contains a number of interface ports 410. These lead to interface modules 420, which are connected by means of fabric ports 430 to ATM switch fabric 440. A control module 450 is also connected to ATM switch fabric 440.

Figure 2:
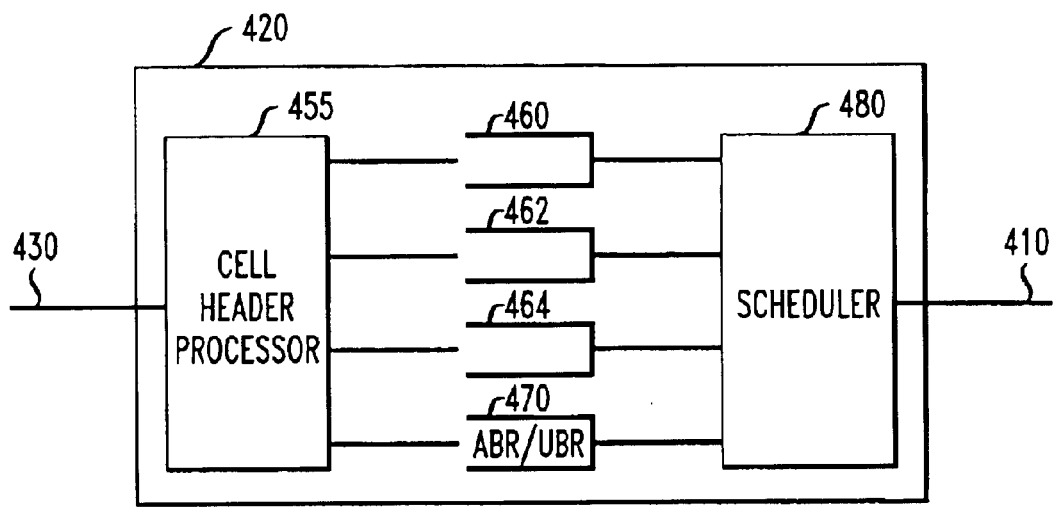
FIG. 2 illustrates an interface module according to the invention.

FIG. 2 illustrates the logical structure of an interface module 420. A cell header processor 455 receives information from the fabric port 430. The cells received are then sent to the class FIFO queues 460, 462, 464, 470 based upon the class of service for the cells. These queues send cells to the scheduler 480, which in turn sends them out through the interface port 410.

In the preferred embodiment of the present invention, UBR and ABR services share one FIFO queue 470, including buffer and bandwidth. The UBR service is controlled by the EPD mechanism, however, unlike the prior art EPD mechanism, the EPD threshold is not constant. It changes in response to bandwidth usage.

Figure 3:
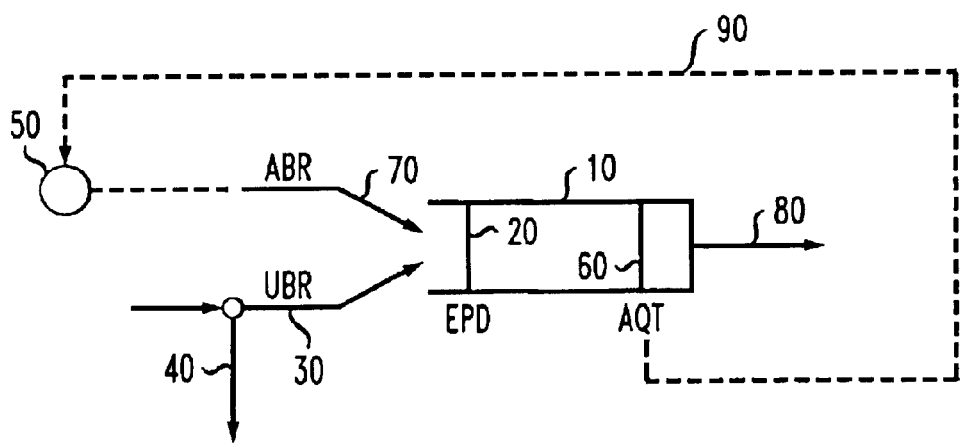
FIG. 3 illustrates a buffer operating according to the invention.

Whenever a new UBR packet arrives at the queue when the total buffer occupancy of the queue (including cells from both ABR and UBR service) exceeds a specific level, all cells of that packet are dropped (with the exception of the final cell, needed for detecting packet boundaries). With reference to FIG. 3, the EPD threshold 20, is represented for buffer 10. The flow of UBR packets in to the buffer 10 is shown at 30, and cell dropping is shown at 40.

Applications utilizing ABR service 50, unlike the applications utilizing UBR service, receive direct feedback, 90, which is a function of the difference between the ABR queue occupancy and the queue threshold value, AQT 60. This feedback 90 allows the applications to adapt to changes in the available resources. In this way, when ABR queue occupancy is high (close to AQT 60) an application using ABR service 50 can recognize that less data should be sent. Applications utilizing ABR service send ABR data to the queue, as depicted by the arrow labeled 70, and data from the queue from both ABR and UBR services is output from the buffer, at 80.

UBR service applications may, of course, also react to changes in available resources when they detect that packets have been dropped, however, this does not occur as a result of direct feedback from the queue or the transfer system as it will in ABR service applications.

In order to adjust the proportional use of the buffer by the ABR and UBR services, the present invention utilizes the EPD threshold 20. As described, changing this threshold value controls packet dropping from the UBR service class. If the bandwidth being achieved for the UBR service is different from the target UBR bandwidth, the EPD threshold 20 can be adjusted up or down to increase or decrease the buffer space available to the UBR service classes, and thereby increase or decrease the UBR bandwidth. However, there is a clear upper limit to the EPD threshold 20 as the buffer 10 is of finite size and must accommodate ABR service as well. Therefore, one embodiment of the present invention provides for the improvement of UBR throughput by adjusting the AQT 60 when the EPD threshold 20 is at its maximum level and UBR bandwidth targets are still not being achieved.

According to the present invention, every update interval T, the EPD threshold 20 is reset to the value:

$$[EPD - a*T*(BW_U - BW^t_U)]^{30}$$

where $[x]^+$ denotes max $\{x,0\}$, EPD is the current EPD threshold, $BW_U$ is the measured bandwidth for UBR, $BW^t_U$ is the target bandwidth for UBR, and a is a positive number. In this way, EPD 20 is decreased if the measured bandwidth exceeds the target bandwidth and increased if the measured bandwidth is less than the target bandwidth. If, at the time of update, the new value for EPD exceeds a set maximum value for EPD 20, then EPD 20 is set at the maximum EPD value, and at the next time T, instead of updating EPD 20, AQT 60 is updated to the value:

$$[AQT + b*T*(BW_U - BW^t_U)]^{30}$$

where, as above, $[x]^+$ denotes max $\{x,0\}$, $BW_U$ is the measured bandwidth for UBR, and $BW^t_U$ is the target bandwidth for UBR. AQT in the above equation is the current AQT value 60, and b is a positive number. After the updating of AQT value 60 is triggered in this way, at successive to update intervals T the AQT value 60, is updated instead of EPD, 20. As in the EPD updating, there is also a maximum value for AQT, and if the new value for AQT 60 is to be greater than the maximum value, AQT 60 is instead set to the maximum value for AQT and EPD updating (according to the first formula) begins again at the next update interval T and will occur at successive update intervals T as before, that is until the new value calculated for EPD 20 exceeds the maximum value for EPD and AQT updating begins. This cycling between EPD updating and AQT updating is illustrated by the following pseudocode:

```
update_action = update_EPD
every update interval T:
    if update_action = update_EPD
        EPD = [EPD - a * T * (BW_U-BW^t_U)]^+
        if EPD > EPD_max
            EPD = EPD_max
            update_action = update_AQT
    else if update_action = update_AQT
        AQT = [AQT + b * T * (BW_U-BW^t_U)]^+
        if AQT > AQT_max
            AQT = AQT_max
            update_action = update_EPD
```

Figure 5:
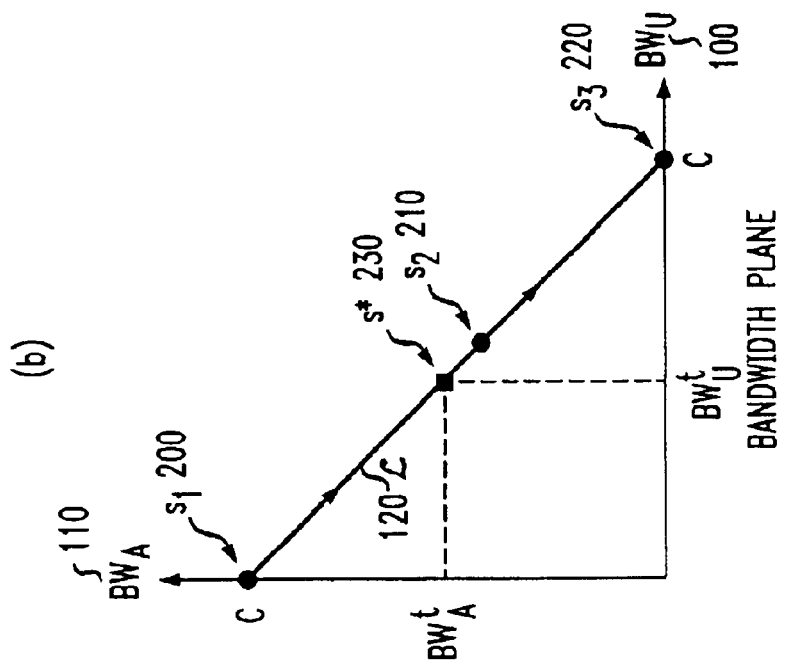
FIGS. 4 and 5 illustrate the mathematical equilibrium caused by operating according to the invention.
Figure 4:
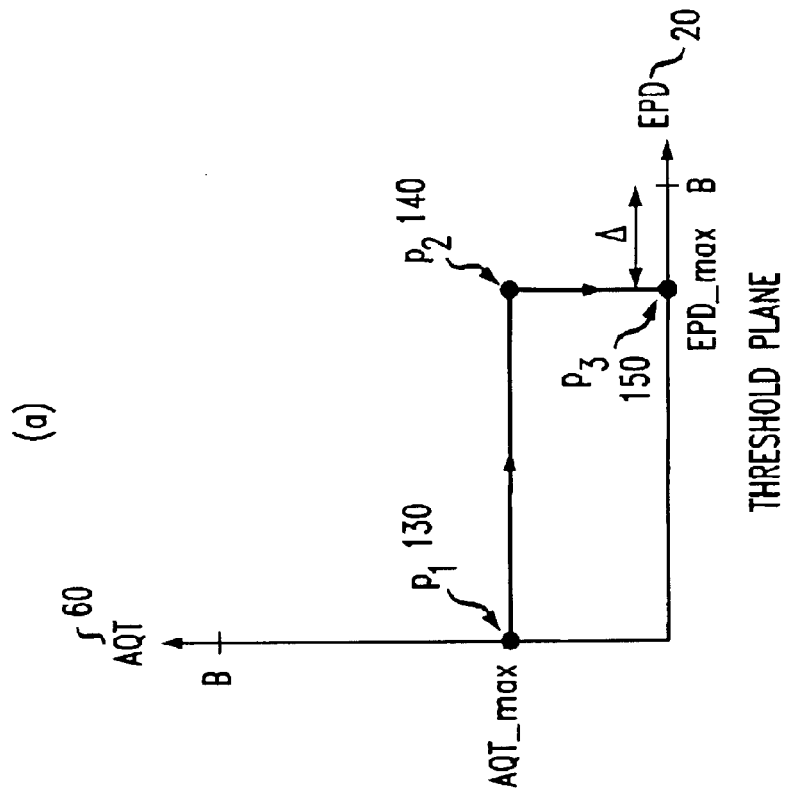

FIGS. 4 and 5 show how this algorithm maps the threshold values (EPD (20) and AQT (60)) in FIG. 4 to the bandwidth values ($BW_U$, 100 and $BW_A$, 110) in FIG. 5. For each point p identified by a specific EPD, 20 and AQT, 60 value in the threshold plane (FIG. 4), there is a corresponding point s in the bandwidth plane (FIG. 5), where the coordinates of point s are given by values of $BW_U$, 100, and $BW_A$, 110, are the bandwidth allocation to UBR and ABR service classes that would result from the thresholds denoted by the point p. In FIG. 4, we only allow points p along the line segments $p_1$, 130 to $p_2$, 140 and the line segment $p_2$, 140 to $p_3$, 150, which corresponds to the idea that we only change one threshold at a time according to the algorithm, while fixing the other at its maximum value. If the ABR and UBR sources are persistent (in the sense that they are capable of consuming any bandwidth allowed by the network) the set of all feasible points s in FIG. 5 will be on the line $\mathcal{L}$, 120, given by $BW_U$, 100+$BW_A$, 110=C. As the threshold point p moves from $p_1$, 130, (0, AQT_max) to $p_2$, 140, (EPD_max, AQT_max) in FIG. 4 the bandwidth allocation moves along the line $\mathcal{L}$, 120, from point $s_1$, 200, to point $s_2$, 210, in FIG. 5. As we start lowering AQT along the segment from $p_2$, 140, to $p_3$, 150, in FIG. 4 we further bias the bandwidth allocation in favor of UBR by moving from $s_2$, 210, to $s_3$, 220, along $\mathcal{L}$, 120, in FIG. 5. Our dynamic thresholding algorithm drives the operating point s in FIG. 4 to the point s*, 230, which is the equilibrium point.

This is only true when the maximum bandwidth of the ABR or UBR connection is larger than the target bandwidth. This may give rise to a situation where the total throughput of the queue is less than the total capacity. This means that the transmission link is being underutilized. In order to prevent this from occurring, one embodiment of the present invention includes an underutilization check. This check occurs periodically; in a preferred embodiment, a number k is defined and the underutilization check occurs once every k update intervals. Referring now to FIG. 3, The check detects underutilization of the link and if it detects underutilization, sets AQT 60 to the maximum AQT value, and EPD 20 to the maximum EPD value.

Figure 6:
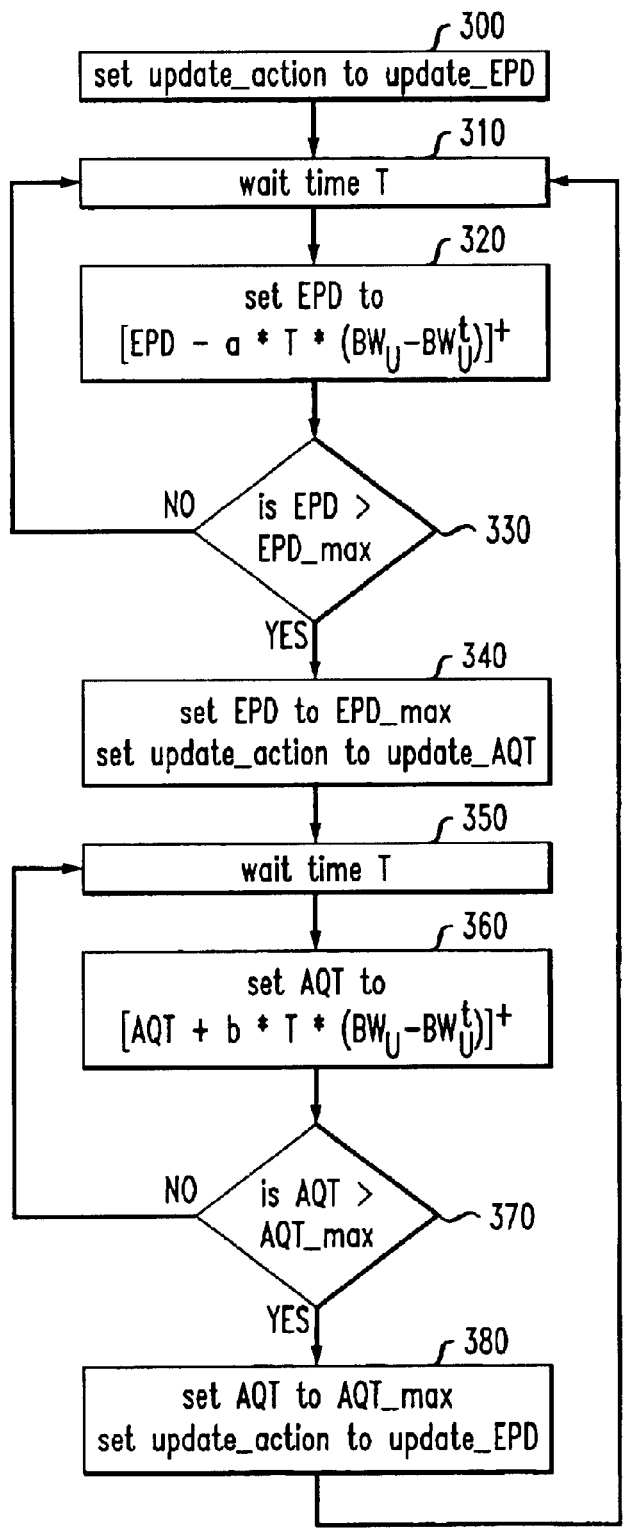
FIG. 6 is a flow chart of the updating of values according to the invention.

FIG. 6 is a flow chart of the updating of EPD 20 (FIG. 3) and AQT 60 (FIG. 3). First, at 300, update_action is set to update_EPD. Then, after waiting a period T, 310, the program resets EPD at 320. A check is then made to see if EPD is under EPD_max, 330. If it is, then the flow chart returns to the wait step 310 and continues from there. However, if it is not, then EPD is set to EPD_max and update_action is set to update_AQT, 340. Then, AQT updating progresses as EPD did. After waiting a period T, 350, the program resets AQT at 360. A check is then made to see if AQT is under AQT_max, 370. If it is, then the flow chart returns to the wait step 350 and continues from there. If not, the program sets AQT to AQT_max, update_action to update_EPD, 380 and returns to wait step 310.

Although the present invention has been described with reference to preferred embodiments, it can be readily understood that the present invention is not restricted to the preferred embodiments and that various changes and modifications can be made by those skilled in the art without departing from the sphere and scope of the present invention.

We claim:

1. A method for providing UBR and one or more other service classes in one single queue, comprising the steps of:
   providing an early packet discard (EPD) value which corresponds to a selected level of occupancy of a buffer of said single queue;
   dropping unspecified bit rate (UBR) data received when an actual level of occupancy of said buffer of said single queue exceeds said EPD value; and
   periodically modifying said EPD value based on a correction term proportional to the difference between a measured UBR bandwidth through said single queue and a target UBR bandwidth.

2. The method of claim 1, further comprising the steps of:
   providing available bit rate (ABR) service in said single queue and controlling said ABR service by means of a AQT value to provide feedback to applications using said ABR service; and
   periodically modifying said AQT value based on data about the flow of ABR data through said single queue.

3. The method of claim 1, where the step of periodically modifying said EPD value based on a correction term proportional to the difference between a measured UBR bandwidth through said single queue and a target UBR bandwidth further comprises:
   modifying said EPD value by (a) calculating a new EPD value equal to said EPD value plus a correction term that is proportional to the difference between measured UBR bandwidth through said single queue and a target UBR bandwidth through said single queue; and (b) setting said EPD value to said new EPD value unless (i) said new EPD value is less than zero, in which case said EPD value is set to zero, or (ii) said new EPD value is greater than a pre-specified maximum EPD value, in which case said EPD value is set to the pre-specified maximum EPD value.

4. An ATM switch with a queue operating according to the method of claim 1.

5. A method for providing unspecified bit rate (UBR) service class in a queue, comprising the steps of:
   providing an early packet discard (EPD) value which corresponds to a selected level of occupancy of a buffer of said queue;
   dropping UBR data received when an actual level of occupancy of said buffer of said queue exceeds said EPD value; and
   periodically modifying said EPD value based on data about the flow of UBR data through said queue using a calculated value proportional to the difference between the actual UBR bandwidth and the target UBR bandwidth.

6. The method of claim 5, wherein the step of periodically modifying said EPD value based on data about the flow of UBR data through said queue using a calculated value proportional to the difference between the actual UBR bandwidth and the target UBR bandwidth further comprises:
   modifying said EPD value by (a) calculating a new EPD value equal to said EPD value plus a correction term that is proportional to the difference between measured UBR bandwidth through said queue and a target UBR bandwidth through said queue; and (b) setting said EPD value to said new EPD value unless (i) said new EPD value is less than zero, in which case said EPD value is set to zero, or (ii) said new EPD value is greater than a pre-specified maximum EPD value, in which case said EPD value is set to the pre-specified maximum EPD value.

7. The method of claim 6, further comprising the steps of:
   providing ABR service in said queue and controlling said ABR service by means of a AQT value to provide feedback to applications using said ABR service; and
   periodically modifying said AQT value based on data about the flow of ABR data through the queue.

8. An apparatus comprising a single queue shared by unspecified bit rate (UBR) and available bit rate (ABR) service classes, further comprising, for said single queue;
   a means for providing an early packet discard (EPD) value which corresponds to a selected level of occupancy of a buffer of said single queue,
   a means for dropping UBR data received when the actual level of occupancy of said buffer of said single queue exceeds said EPD value, operably connected to said means for providing an EPD value and said single queue; and
   a means for periodically modifying said EPD value using a correction term proportional to the difference between a measured UBR bandwidth through said single queue and a target UBR bandwidth.

9. The apparatus of claim 8, where said means for periodically modifying said EPD value comprises means for (a) calculating a new EPD value equal to said EPD value plus a correction term that is proportional to the difference between the measured UBR bandwidth through said single queue and the target UBR bandwidth through said single queue; and (b) setting said EPD value to said new EPD value unless (i) said new EPD value is less than zero, in which case said EPD value is set to zero, or (ii) said new EPD value is greater than a pre-specified maximum EPD value, in which case said EPD value is set to the pre-specified maximum EPD value, operably connected to said single queue and said means for providing an EPD value.

10. The apparatus of claim 9, further comprising:
    means for providing ABR service in said single queue and controlling said ABR service by means of a AQT value to provide feedback to applications using said ABR service; and, means for modifying said AQT value when said means for periodically modifying said EPD value by calculating a new EPD value calculates a new EPD value greater than a specified maximum EPD value.

11. The apparatus of claim 10, where said means for modifying said AQT value comprises:
    means for calculating a new value equal to said AQT value plus a second correction term that is proportional to the difference between said measured UBR bandwidth through said single queue and said target UBR bandwidth through said single queue, and setting said AQT value to the new value unless that new value is less than zero, in which case said AQT value is set to zero, or greater than a specified maximum AQT value, in which case said AQT value is set to the specified maximum AQT value and said calculation of new EPD values is resumed, operably connected to said means for providing ABR service in said single queue and controlling said ABR service by means of an AQT value and said means for providing an EPD value.

12. The apparatus of claim 11, further comprising: means for periodically performing a check for underutilization of said single queue and, if underutilization is detected, setting said EPD value to said specified maximum EPD value and setting said AQT value to said specified maximum AQT value, operably connected to said single queue and said means for providing an EPD value.

13. The apparatus of claim 8, where said apparatus is an ATM switch.

14. An apparatus comprising a queue shared by unspecified bit rate (UBR) and available bit rate (ABR) service classes, further comprising:

electronic circuitry which provides an early packet discard (EPD) value which corresponds to a selected level of occupancy of a buffer of said queue;

electronic circuitry which drops UBR data received when the actual level of occupancy of said buffer of said queue exceeds said EPD value, operably connected to said electronic circuitry which provides an EPD value and said queue; and electronic circuitry for which periodically modifies said EPD value by (a) calculating a new EPD value equal to said EPD value plus a correction term that is proportional to the difference between the measured UBR bandwidth through said queue and the target UBR bandwidth through said queue; and (b) setting said EPD value to said new EPD value unless (i) said new EPD value is less than zero, in which case said EPD value is set to zero, or (ii) said new EPD value is greater than a pre-specified maximum EPD value, in which case said EPD value is set to the pre-specified maximum EPD value, operably connected to said electronic circuitry which provides an EPD value and said queue.

15. The apparatus of claim 14, further comprising:

electronic circuitry which provides ABR service in said queue and controls said ABR service by means of a AQT value to provide feedback to applications using said ABR service, operably connected to said queue;

electronic circuitry which modifies said AQT value when said electronic circuitry which periodically modifies said EPD value by calculating a new EPD value calculates a new EPD value greater than a specified maximum EPD value, by calculating a new value equal to said AQT value plus a second correction term that is proportional to the difference between said measured UBR bandwidth through said queue and said target UBR bandwidth through said queue and setting said AQT value to the new value unless that new value is less than zero, in which case said AQT value is set to zero, or greater than a specified maximum AQT value, in which case said AQT value is set to the specified maximum AQT value and said calculation of new EPD values resumes, operably connected to said electronic circuitry which provides an EPD value and said electronic circuitry which provides ABR service in said queue and controls said ABR service by means of an AQT value.

16. The apparatus of claim 15, further comprising:

electronic circuitry for periodically performing a check for underutilization of said queue and, if underutilization is detected, setting said EPD value to said specified maximum EPD value and setting said AQT value to said specified maximum AQT value, operably connected to said queue and said electronic circuitry for providing an EPD value.

17. The method of claim 7, where said step of periodically modifying said AQT value based on data about the flow of ABR data through said queue further comprises: modifying said AQT value when said step of periodically modifying said EPD value calculates a new EPD value greater than said pre-specified maximum EPD value by calculating a new value equal to said AQT value plus a second correction term that is proportional to the difference between said measured UBR bandwidth through said queue and said target UBR bandwidth through said queue and setting said AQT value to the new value unless that new value is less than zero, in which case said AQT value is set to zero, or greater than a specified maximum AQT value, in which case said AQT value is set to a specified maximum AQT value and the step of periodically modifying said EPD value is resumed.

18. The method of claim 17, further comprising the step of:

periodically performing a check for underutilization of the queue and, if underutilization is detected, setting said EPD value to said pre-specified maximum EPD value and setting said AQT value to said specified maximum AQT value.

* * * * *